Nov. 10, 1925.
C. J. JULSTEDT
1,560,802
CONVERTIBLE VEHICLE
Filed Oct. 23, 1923   2 Sheets-Sheet 1
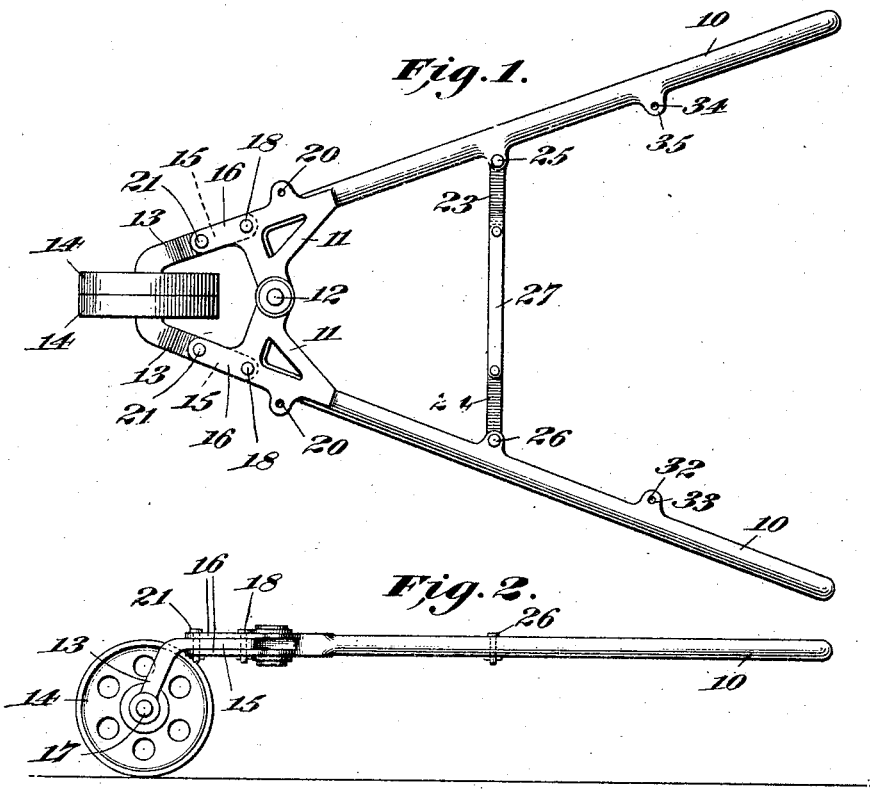
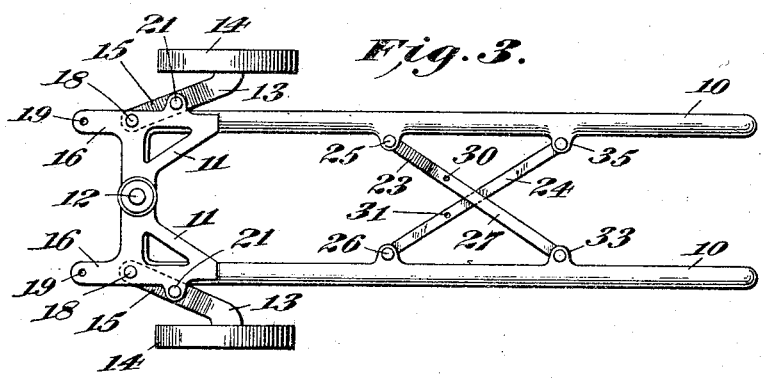
INVENTOR
Olas J. Julstedt.
BY
ATTORNEYS Nov. 10, 1925.
C. J. JULSTEDT
1,560,802
CONVERTIBLE VEHICLE
Filed Oct. 23, 1923 2 Sheets-Sheet 2
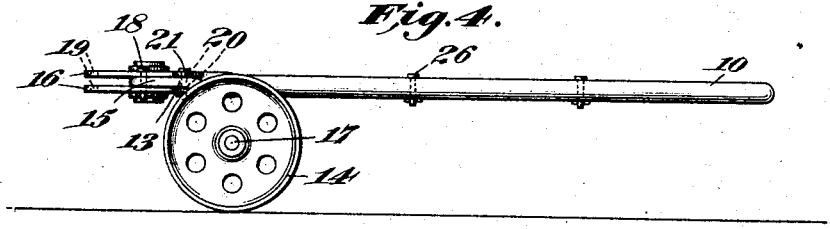
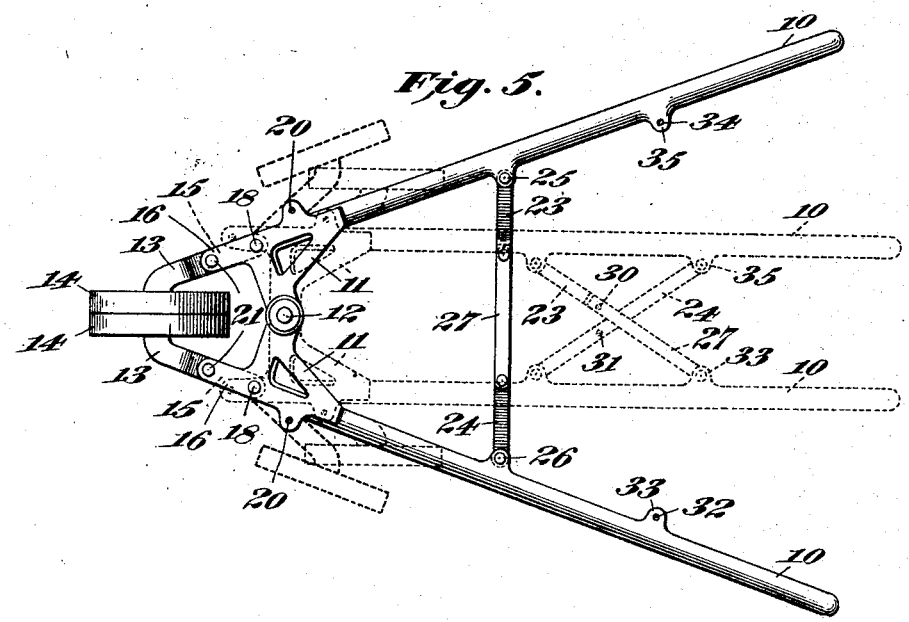
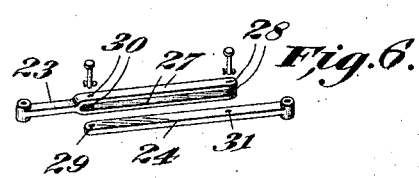
INVENTOR
Clas J. Julstedt.
BY
ATTORNEYS Patented Nov. 10, 1925.

1,560,802

UNITED STATES PATENT OFFICE.

CLAS J. JULSTEDT, OF BETHLEHEM, PENNSYLVANIA, ASSIGNOR TO BETHLEHEM STEEL COMPANY, A CORPORATION OF PENNSYLVANIA.

CONVERTIBLE VEHICLE.

Application filed October 23, 1923. Serial No. 670,263.

*To all whom it may concern:*

Be it known that I, CLAS J. JULSTEDT, a citizen of the United States, and residing at Bethlehem, county of Lehigh, State of Pennsylvania, have invented certain new and useful Improvements in Convertible Vehicles, of which the following is a specification.

My invention relates to vehicles and it has for its object to provide a vehicle which may be converted from one of the two-wheel cart type into one of the wheelbarrow type and vice versa.

While my improved convertible vehicle is useful in various relations, one particular field of utility is in connection with carriages for light artillery in order to give increased mobility to the latter.

Apparatus made in accordance with my invention is illustrated in the accompanying drawings, forming a part of this application, in which—

Figure 1 is a plan view of my improved vehicle showing one operative position thereof;

Figure 2 is a side elevation of the apparatus shown in Figure 1;

Figure 3 is a plan view showing a second operative position of the vehicle;

Figure 4 is a side elevation of the apparatus in the position shown in Figure 3;

Figure 5 is a plan view shown in full and dotted lines and indicating how the vehicle is changed from the type shown in Figure 1 to the type shown in Figure 3 and vice versa;

Figure 6 is a detail view of the connecting link construction.

Referring now to the drawings for a better understanding of my invention, I show a pair of handle or shaft members 10, each of which is provided with a laterally extending projection 11, and the projections are pivotally connected by a suitable pivot pin, at 12.

Swivel members 13 are pivotally connected to the ends of the handle members 10 adjacent to the projections 11 and each swivel member carries a wheel 14.

Each of the swivel members 13 is provided with a pivotal shank portion 15 which fits within the bifurcated end portion 16 of a handle member. Each swivel member is also provided with a laterally extending journal portion 17 for carrying a wheel 14.

Each of the swivel members 13 is adjustable to two positions with respect to the bifurcated handle ends 16. To this end, the shank portions 15 have permanent pivotal connections 18 with respect to the bifurcated ends 16; and the bifurcated end portions are preferably provided with openings 19 and 20 disposed equi-distantly from the pivotal connection 18 and which are adapted to register with an opening in the shank portion 15 of the swivel member when the latter is moved for this purpose; a key or pin 21 being provided for passage through registering openings in the bifurcated end and in the shank portion in order to hold a swivel member rigid with respect to its handle member.

In Figure 1, I show the pins 21 passing through the forward openings 19 for holding the swivel members 13 in position to extend forwardly of the handle members with the journal portions thereof extending inwardly between the handle members. In Figure 3, I show the swivel members 13 in another position in which they have been moved about the pivots 18 and the pins 21 have been inserted through the rear openings 20 in order to hold the swivel members rigid with respect to the handle members and with the journal members extending outwardly from the handle members.

In order, with the apparatus so far described, that the wheels 14 carried by the journal portions 17 of the swivel members may be caused to assume juxtaposed side-by-side relationship to render the vehicle effective as one of the wheelbarrow type, as shown in figure 1, and in order that the vehicle may be converted from one of the latter type to one of the two-wheel cart type, as shown in Figure 3, it is necessary that means be provided whereby the handle or shaft members may be capable of relative movement and of being definitely spaced in two positions as indicated in Figures 1 and 3. To this end, the handle members are pivotally connected as heretofore described and any suitable means for securing the handle members 10 in two positions is provided. For example, I show links 23 and 24 which are pivotally connected to the handle members at 25 and 26, the link 23 having a bifurcated portion 27 which is adapted to receive the link 24 between the furcations thereof. The links 23 and 24 are provided with openings 28 and 29 at the ends thereof and such links are provided, respectively, with openings 30 and 31 at intermediate points and spaced equi-distantly from the openings 28 and 29 respectively. Obviously, as shown in Figure 1, if the link 24 is placed between the furcations of the bifurcated portion 27 and pins are passed through the registering openings 29 and 30 and 28 and 31, the shaft members 10 will be held rigidly with respect to each other.

When changing the shaft members from the position shown in Figure 1 to that shown in Figure 3, the pins are removed from the openings in the links 23 and 24 and the latter are caused to cross each other, the link 24 passing between the furcations of the bifurcated portion 27, and the pivotal openings 28 in the link 23 are caused to register with openings 32 in the lugs 33 carried by the opposite handle member 10. In like manner, the terminal opening 29 of the link 24 is caused to register with an opening 34 in the lug 35 carried by the other handle member 10. As the handle members are moved inwardly, the links 23 and 24 crossing each other, and the terminal openings 28 and 29 being in register with the openings 32 and 34, respectively, pins may be passed through the registering openings to hold the handle members in the fixed position shown in Figure 3.

It will be noted that the journal portions 17 of the swivel members are in axial alignment in Figures 1 and 3 but that the positions thereof as shown in these views are necessarily 180° apart. Starting with the position of parts shown in Figure 1, if it is desired to change the vehicle from one of the wheelbarrow type to one of the two-wheel cart type, the pins in the overlapped link construction consisting of the link members 23 and 24 are first removed and the handle members 10 are caused to approach each other until the ends of the links may be fastened to the lugs 33 and 35 as heretofore described. Thereupon the pins 21 are removed from the openings 19 in the bifurcated handle ends and the swivel members 13 are pivotally moved about the pivotal connections 18 rearwardly until the openings in the shank portions 15 of the swivel members register with the rear openings 20 in the bifurcated shaft ends, whereupon the pins 21 are placed in the latter register openings to hold the swivel members in the position shown in Figure 3.

It is necessary to provide for movement of the handle members with respect to each other in order that the wheels 14 may clear each other in moving from the position shown in Figure 1 to that shown in Figure 3. The angle through which each handle member 10 is moved plus the angle through which its swivel member 13 is moved from the position shown in Figure 1 to that shown in Figure 3 is equal to 180° so that the journal portions may be in axial alignment in both positions.

Assuming that the vehicle is in the two-wheel cart form, as shown in Figure 3, and it is desired to change it to one of the wheelbarrow type, the pins 21 are first removed and the swivel members 13 are moved forwardly to bring the openings in the shank portions 15 thereof in registry with the forward openings 19 in the bifurcated handle ends, whereupon the pins 21 are inserted through the registering openings and the swivel members now have their journal portions 17 and the wheels 14 carried thereby extending inwardly toward each other and between the handle members 10. Thereupon the outer ends of the crossed links 23 and 24 are detached from the handle members and the handle members are moved outwardly until the wheels are brought into juxtaposed and side-by-side relationship, as shown in Figure 1, at which time the terminal and intermediate openings in the links 23 and 24 will be in registry for the insertion of pins so that the latter may be held together in overlapped relationship.

If the apparatus herein described is utilized as a gun mount, it will be apparent, as shown in dotted lines in Figure 5, that the handle members 10 may be moved outwardly from the position shown in Figure 3 without having first moved the swivel members, whereby the apparatus may be caused to serve as an effective gun mount or tripod which may be readily turned or moved in arcuate paths, the handle members being separated sufficiently to constitute an adequate support.

From the foregoing description, it will be apparent that I have provided a convertible vehicle which is simple from the standpoint of structure and which may be readily converted from a vehicle of the wheelbarrow type to one of the two-wheel cart type and vice versa. My improved vehicle is capable of being used for any suitable purpose, and it is particularly useful in connection with mobile light artillery, not only for the purpose of transporting the latter but it is also adjustable for properly supporting and getting in position a desired piece of artillery.

Having thus described the invention, what is claimed as new and desired to be secured by Letters Patent is:

1. In a convertible vehicle, the combination of a pair of pivotally connected handle members, a swivel member pivotally connected to one end of each handle member, wheels carried by the swivel members, means for holding the handle members in two relatively fixed positions, means for holding the swivel members in fixed positions with respect to the handle members so that when the latter occupy one of the fixed positions the wheels are juxtaposed in side-by-side relationship and the vehicle is effective as one of the wheelbarrow type, and means for holding the swivel members in other fixed positions with respect to the handle members so that when the latter occupy their other fixed positions the wheels are spaced apart and substantially parallel to render the vehicle effective as a two-wheel cart.

2. In a convertible vehicle, the combination of a pair of handle members pivotally connected together at one end, means for holding the handle members in inclined or substantially parallel positions with respect to each other, swivel members pivotally connected to the handle members near the pivoted ends of the latter, wheels carried by the swivel members, means for holding the swivel members in one position with respect to the handle members with the wheels between the handles and inclined with respect thereto so that when the handles are fixed in inclined positions the wheels are arranged in juxtaposed side-by-side relationship and the vehicle is effective as one of the wheelbarrow type, and means for holding the swivel members fixed with respect to the handle members with the wheels outside of the latter and substantially parallel to the handle members so that when the latter are secured in parallel relation the vehicle is effective as a two-wheel cart.

3. In a convertible vehicle, the combination of a pair of pivotally connected handle members, means for holding the handle members in two relatively fixed positions with respect to each other, swivel members pivotally connected each at a single end of the handle members, a wheel carried by each swivel member, means for holding the swivel members in fixed positions with respect to the handle members with the wheels between the handle members so that when the latter occupy one of said fixed positions the wheels are arranged in juxtaposed side-by-side relationship to render the vehicle effective as one of the wheelbarrow type, and means for holding the swivel members in other fixed positions with respect to the handle members with the wheels outside of the handle members so that when the latter are held fixed in the other position the vehicle is effective as a two-wheel cart.

4. In a convertible vehicle, the combination of a pair of handle members, each handle member having a laterally extending projection near one end and the projections being pivotally connected together, means for holding the handle members in two relatively fixed positions with respect to each other, swivel members having pivotal shank portions and journal portions, wheels on the journal portions, pivotal connections between the shank portions and the handle members, and means for keying each shank portion in two positions with respect to its handle member.

5. In a convertible vehicle, the combination of a pair of handle members, each handle member having a laterally extending projection near one end and the projections being pivotally connected together, means for holding the handle members in two relatively fixed positions with respect to each other, swivel members having pivotal shank portions and journal portions inclined with respect to the shank portions, wheels on the journal portions, pivotal connections between the shank portions and the handle members, and means for keying each shank portion in either of two positions with respect to its handle member.

6. In a convertible vehicle, the combination of a pair of handle members, each handle member having laterally extending projections near one end and the projections being pivotally connected together, links pivotally connected to the handle members, means for securing the links together in overlapping relation to hold the handle members spaced apart and in inclined relationship with respect to each other, means for securing the outer end of each link member to the other handle member, whereby the handle members may be held in fixed relative positions but spaced closer together, swivel members pivotally connected to the handle members at the ends of the latter adjacent to said laterally extending projections, wheels carried by the swivel members, means for keying the swivel members each in one position with respect to its handle member with the wheels arranged between and inclined with respect to the handle members, whereby, when the latter are held in spaced relationship with the links overlapped and connected together, the wheels are juxtaposed in side-by-side relationship and the vehicle is effective as one of the wheelbarrow type, and means for keying the swivel members each in another position with respect to its handle member, whereby, when the handle members are connected by having the outer ends of the links attached thereto, the wheels are substantially parallel and the vehicle is effective as a two-wheel cart.

7. In a convertible vehicle, the combination of a pair of handle members, each handle member having a laterally extending projection near one end and the projections being pivotally connected together, links pivotally connected to the handle members, means for securing the links together in overlapped relation to space the handle members apart for one operative position thereof, means for keying the outer ends of the links to opposed handle members, whereby the latter may be held spaced apart in a second operative position, swivel members having pivotal shank portions and journal portions inclined with respect thereto, means for pivotally connecting each shank portion to a handle member, wheels carried by the journal portions, means for keying the shank portions each in one position with respect to its handle member so that the journal members extend between the handle members and the wheels are held inclined therebetween, whereby, when the handle members are held spaced apart with the links overlapped and connected together, the wheels are juxtaposed and in side-by-side relationship to render the vehicle effective as one of the wheelbarrow type, means for keying each shank portion in another position with respect to its handle member, whereby, when the outer ends of the links are attached to the opposed handle members, the wheels are arranged in substantially parallel and spaced apart relationship to render the vehicle effective as a two-wheel cart.

8. In a convertible vehicle, the combination of a pair of handle members, each handle member having a laterally extending projection near one end and the projections being pivotally connected together, means for holding the handle members in two fixed positions with respect to each other, swivel members having pivotal shank portions and journal portions inclined with respect to the shank portions, wheels on the journal portions, pivotal connections between the shank portions and the handle members, openings in the handle members disposed equi-distantly with respect to the pivotal connections forwardly and rearwardly of the latter, an opening in each shank member between the pivotal connection and the journal portion and spaced the same distance from the pivotal connection as the openings in the handle members, and key means for insertion through either of the openings in a handle member and through an opening in a shank member when the openings are caused to register by proper movement of a shank member, whereby the wheels may each be held in two positions with respect to their handle members.

9. In a convertible vehicle, the combination of a pair of handle members, each handle member being bifurcated at one end and each having a laterally-extending projection at the bifurcated end, means for pivotally connecting the projections together, swivel members having journal portions and pivotal shank portions fitting the bifurcations, means for pivotally connecting the shank portions to the bifurcated ends, openings in the handle members disposed forwardly and rearwardly of the pivotal connection and equi-distantly with respect to the latter, an opening in each shank portion adapted to register, upon proper swiveling motion of the swivel members, with either of said openings in the handle members, key means for insertion through registering openings, means for holding the handle members spaced apart in one fixed relative position with the wheels juxtaposed and in side-by-side relationship when the key means pass through the openings in the handle members forwardly of the pivotal connections for the shank portions, whereby the vehicle is effective as one of the wheelbarrow type, and means for holding the handle members spaced apart in another fixed relative position so that, when the shank members are keyed to the handle members with the openings in the latter rearwardly of the pivotal connections for the shank portions in registry with the key openings in the shank portions, the wheels will be spaced apart in substantially parallel relation and the vehicle will be effective as a two-wheel cart.

10. In a vehicle, the combination of a pair of handle members pivotally connected at one end, swivel members pivotally connected to the handle members, wheels carried by the swivel members, links connected to the handle members, means for connecting the links together for one operative position of the handle members, means for connecting the outer ends of the links to the opposed handle members for another operative position thereof, means for keying the swivel members to the handle members whereby the wheels are juxtaposed in side-by-side relationship between the handle members when the links are secured together in order to render the vehicle effective as one of the wheelbarrow type, and means for keying the swivel members each in a second position with respect to its handle member whereby, when the outer ends of the links are connected to the opposed handle members, the wheels are disposed in spaced apart and substantially parallel relation and the vehicle is effective as a two-wheel cart.

11. In a convertible vehicle, the combination of handle members pivotally connected together at one end, links pivotally connected to the handle members, means for securing the links together in overlapped relation for one operative position of the handle members, means for connecting the outer ends of the respective links to the opposed handle members for a second operative position of the latter, swivel means pivotally connected to the handle members and having journal portions, wheels carried by the journal portions, means for keying the swivel members each in a position with respect to its handle member such that when the handle members are spaced apart by having the links secured together in overlapping relationship, the journal portions are axially aligned and extend toward each other with the wheels juxtaposed in side-by-side relationship to render the vehicle effective as one of the wheelbarrow type, means for keying each of the swivel members in a second position with respect to its handle member, whereby the journal portions thereof will be axially aligned or parallel but extending in opposite directions when the outer ends of the links are connected to opposed handle members in order to render the vehicle effective as a two-wheel cart.

12. In a convertable vehicle, the combination of a pair of handle members pivotally connected at one end, means for holding the handle members in two relatively fixed positions, swivel members connected to the handle members and having journal portions, wheels carried by the journal portions, means for keying the swivel members each in one position with respect to its handle member so that the journal portions are in alignment and extend toward each other for one operative position of the handle members, and means for keying the swivel members each in another position with respect to its handle member, whereby the journal portions extend outwardly in opposite directions and are in alignment for the other operative position of the handle members.

13. In a convertible vehicle, the combination of a pair of handle members pivotally connected together at one end, spacing means for obtaining two fixed relative positions of the handle members, swivel members pivotally connected to the handle members and having laterally-extending journal portions, wheels carried by the journal portions, and means for fastening each swivel member in two positions with respect to its handle member spaced apart 180° minus the angle of movement of each handle member between the two positions thereof.

In testimony whereof I hereunto affix my signature this nineteenth day of October 1923.

CLAS J. JULSTEDT.